United States Patent
Seiler

(10) Patent No.: US 11,288,788 B2
(45) Date of Patent: Mar. 29, 2022

(54) ANTI-ALIASING FOR DISTANCE FIELD GRAPHICS RENDERING

(71) Applicant: Facebook Technologies, LLC, Menlo Park, CA (US)

(72) Inventor: Larry Seiler, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 31 days.

(21) Appl. No.: 16/992,890

(22) Filed: Aug. 13, 2020

(65) Prior Publication Data

US 2022/0051381 A1    Feb. 17, 2022

(51) Int. Cl.
| | |
|---|---|
| *G06T 13/40* | (2011.01) |
| *G06T 7/00* | (2017.01) |
| *G06T 7/73* | (2017.01) |
| *G06T 15/50* | (2011.01) |
| *G06T 3/40* | (2006.01) |
| *G06T 7/90* | (2017.01) |

(52) U.S. Cl.
CPC .......... *G06T 7/0002* (2013.01); *G06T 3/4007* (2013.01); *G06T 7/74* (2017.01); *G06T 7/90* (2017.01); *G06T 15/503* (2013.01)

(58) Field of Classification Search
CPC ..... G06T 1/0028; G06T 11/001; G06T 15/04; G06T 15/08; G06T 11/20; G06T 19/20; G06T 3/40; G06T 5/20; G06T 3/4053; A61B 34/10; G16H 50/50; G16H 30/40
See application file for complete search history.

(56) References Cited

U.S. PATENT DOCUMENTS

| | | | |
|---|---|---|---|
| 2016/0358312 A1* | 12/2016 | Kolb, V | ................... G06T 3/40 |
| 2019/0108657 A1* | 4/2019 | Petersen | ............... G06T 11/206 |
| 2020/0134879 A1 | 4/2020 | Seiler et al. | |

OTHER PUBLICATIONS

Antialiasing with a signed distance field, Musing Mortoray, https://mortoray.com/2015/06/19/antialiasing-with-a-signed-distance-field/ , 7 pages, Jun. 19, 2015.
Chlumsky V., et al., "Improved Corners with Multi-Channel Signed Distance Fields," Computer Graphics Forum, Sep. 1, 2017, vol. 37, No. 1, [Retrieved on Jan. 13, 2021], pp. 273-287, Retrieved from the Internet: https://onlinelibrary.wiley.com/doi/pdf/10.1111/cgf.13265.

(Continued)

*Primary Examiner* — Phuoc H Doan
(74) *Attorney, Agent, or Firm* — Baker Botts L.L.P.

(57) ABSTRACT

In one embodiment, a computing system may determine, for a pixel, a sampling location within a texture that comprises a plurality of texels, and based on the sampling location, select a set of texels in the plurality of texels. Each texel in the set of texels may encode a distance field. An interpolated distance field associated with the sampling location may be computed based on the distance fields associated with the set of texels. The interpolated distance field may represent a relative distance between the sampling location and a texture edge. According to a blending proportion based on the interpolated distance field, the computing system may determine a blended color for the sampling location by blending, a first and second color associated with a first side of the edge and a second side of the edge, and output a color for the pixel based on the blended color.

20 Claims, 8 Drawing Sheets

(56) References Cited

OTHER PUBLICATIONS

International Search Report and Written Opinion for International Application No. PCT/US2021/044049, dated Nov. 18, 2021, 10 pages.
Lee S.H., et al., "Adaptive Synthesis of Distance Fields," IEEE Transactions on Visualization and Computer Graphics, vol. 18, No. 7, Jul. 2012, pp. 1135-1145.
Qin Z., et al., "Real-Time Texture-Mapped Vector Glyphs," Proceedings of the 2006 symposium on Interactive 3D graphics and games, Mar. 2006, pp. 125-132.
Yang L., et al., "Amortized Supersampling," ACM Transactions on Graphics (TOG), Dec. 1, 2009, vol. 28.(5), pp. 1-12.

\* cited by examiner

ANTI-ALIASING FOR DISTANCE FIELD GRAPHICS RENDERING

TECHNICAL FIELD

This disclosure generally relates to computer graphics. More specifically, the disclosure relates to improved techniques for rendering text, symbols, glyphs, and other graphics defined using distance fields.

BACKGROUND

Computer graphics, in general, are visual scenes created using computers. Three-dimensional (3D) computer graphics provide users with views of 3D objects from particular viewpoints. Each object in a 3D scene (e.g., a teapot, house, person, etc.) may be defined in a 3D modeling space using basic geometries. For example, a cylindrical object may be modeled using a cylindrical tube and top and bottom circular lids. The cylindrical tube and the circular lids may each be represented by a network or mesh of smaller polygons (e.g., triangles). Each polygon may, in turn, be stored based on the coordinates of their respective vertices in the 3D modeling space.

One problem in computer graphics is efficient and high-quality rendering of two-dimensional (2D) graphics (e.g., images consisting of solid color regions, as distinct from 3D graphics, which typically contains shaded or patterned regions). 2D graphics may be placed in a 3D scene and observed from any viewpoint, which causes the original 2D graphics to appear distorted. When generating a scene for a display, a rendering system typically samples the 2D graphics from the viewpoint of the user/camera to determine the appropriate color that should be displayed by the pixels of the screen. The color to be displayed by a pixel is typically determined using a filtering technique, such as bilinear interpolation, that estimates the color based on multiple color information in the 2D graphic near a corresponding sampling location. Since multiple color information is used to estimate the color of a single pixel, edges of the rendered graphic would appear blurry or less sharp. The goals for addressing the aforementioned problem for 2D graphics can be characterized as: (1) defining a more compact way to represent 2D graphics images, and (2) defining a way to have crisp edges between the solid color regions despite the resample filtering that is required in many graphics applications, such as augmented and virtual reality, to accommodate geometric distortions, which normally causes blurring.

These problems are particularly acute when rendering text, which requires rendering fine edge details between the text and background regions. When the text is static, it is not a problem to take time and computational resources to pre-render it with high precision. For example, a character may be stored as a texture with color data (e.g., red, green, and blue) per texel and, when needed, rendered onto a screen. The character may look reasonably good when it is small, but pixilation and aliasing may become more pronounced if it is stretched, magnified, rotated, or distorted (e.g., due to changes in transformation, perspective, or the text itself changes).

SUMMARY OF PARTICULAR EMBODIMENTS

Embodiments described herein address the problems related to graphics rendering, as discussed above. More specifically, particular embodiments relate to improved techniques for rendering labels ("labels," as used herein, refers to characters, fonts, glyphs, icons, and other 2D images consisting of solid color regions) defined using distance fields. Since text is an example of a particularly difficult and common problem that could be solved by the present disclosure, text will be used as the primary example to illustrate the various techniques described. However, it should be noted that the techniques described herein could apply to different types of labels, including icons and other 2D images.

Distance fields may be used in place of RGB color information to specify the appearance of each pixel in an image (or each texel in a texture) to represent text, icons, and vector graphics. Distance fields can be resampled without introducing artifacts, including when the labels are magnified and/or stretched. However, standard methods of rendering distance fields produce pixel-aliased images. That is because in the standard method, sampling a distance field label produces a discrete, predetermined value per pixel. For example, the distance field of a particular sampled location may be computed using bilinear interpolation of the distance fields of the four nearest texels. The sampled distance field may indicate whether the sampled location falls "in" or "out" of the label (e.g., in the body of the text or out in the background). If the sampled location is "in," a corresponding color would be assigned (e.g., if the label is red over a green background, the color assigned for an "in" distance field would be red). Similarly, if the sampled location is "out," a corresponding background color would be assigned (e.g., green). In this example, the color of each pixel is determined in a binary fashion, which could introduce aliasing artifacts in certain viewing conditions.

Particular embodiments described herein provide ways to produce anti-aliased results when rendering labels defined by distance fields. For example, alpha blending can be used to blend the "in" color and "out" color of a label to determine the color of a pixel. The ratio of the blend may be determined using the computed distance field of the sampled location associated with the pixel (e.g., if the sampled location is directly on the edge of a label, the "in" color and "out" color could be evenly blended in a 50%-50% fashion). When an image is stretched (e.g., when text is reviewed from an angle or wraps around a curved surface in a 3D environment), jittering may also be used to reduce aliasing. In particular embodiments, jittering may be applied in the direction with wider sample spacings (e.g., the direction where the image is the most stretched).

In particular embodiments, a computing system may determine, for a pixel, a sampling location within a texture that comprises a plurality of texels. Based on the sampling location, the computing system may select a set of texels in the plurality of texels. Each texel in the set of texels may encode at least a distance field. Based on the distance fields associated with the set of texels, the computing system may compute an interpolated distance field associated with the sampling location. The interpolated distance field may represent a relative distance between the sampling location and an edge depicted in the texture. The computing system may determine a blending proportion based on the interpolated distance field. The computing system may determine a blended color for the sampling location by blending, according to the blending proportion, a first color associated with a first side of the edge and a second color associated with a second side of the edge. The computing system may output a color for the pixel based on the blended color of the sampling location.

Embodiments of the invention may include or be implemented in conjunction with an artificial reality system.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
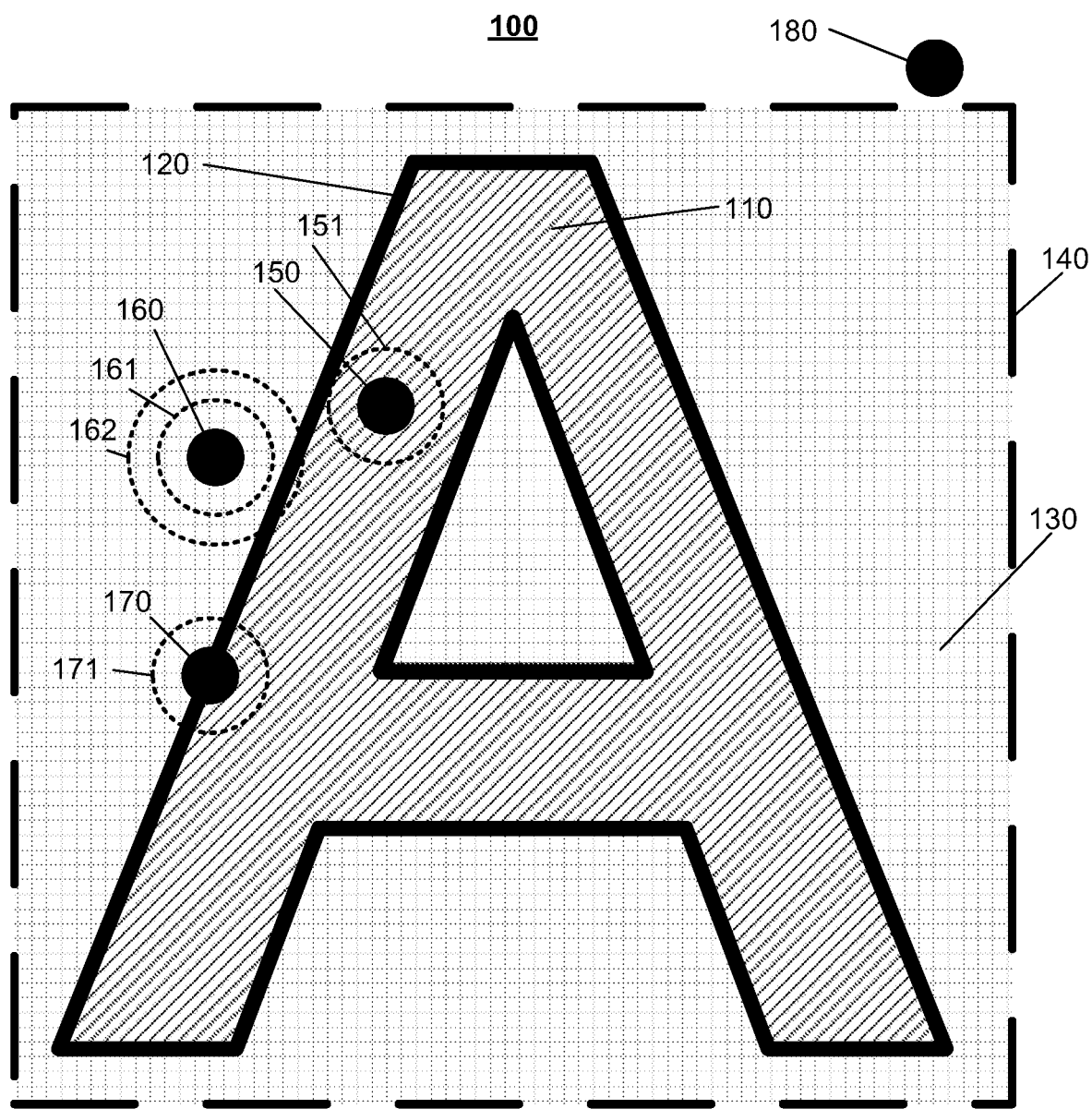
FIG. 1 illustrates an example texel array with various sampling locations placed inside and outside the edges of a character shape.

This application describes techniques for graphics rendering (e.g., text, icon, glyphs, 2D images, etc.) when the transformation, perspective, or the graphic itself may change dynamically in real-time, such as in situations of graphics rendering in augmented reality (AR) and virtual reality (VR). One example technique used in real-time graphics rendering relies on storing the character shapes (e.g., glyphs) in structures called signed distance fields, or simply distance fields. In general, a distance field is the result of a signed distance transformation applied to a subset of N-dimensional space, which is a vector shape that is to be rendered (e.g., text, icons, etc.). The distance field maps each point P of the space to a scalar signed distance value. A signed distance may be defined as follows: If the point P belongs to the subset (e.g., if the point P is within the text or icon to be rendered), the signed distance is the positive minimum distance to the closest edge of the shape of the subset. This is also referred to as being "inside" or "in," and may be encoded by having the most significant bit (MSB) of an m-bit distance field be 1. If it does not belong to the subset (e.g., if the point P is outside the text or icon to be rendered), the signed distance is the negative distance to the closest edge of the shape of the subset. This is also referred to as being "outside" or "out," and may be encoded by having the MSB of an m-bit distance field be 0. The distance field may use Euclidean distances whose domain is two-dimensional space only.

Generally, particular embodiments of display engines for driving AR and/or VR displays are fed data to display, and the display engine performs distortion, resampling, composition, and color correction necessary to adjust for the characteristics of the AR/VR display device (e.g., a device used by or worn by a user). Each frame of a scene displayed to the user is generated based on the current head position, current eye position, current eye movement, other relevant positions of the user, or any combination thereof. The details of the scene of each frame may be generated by performing bilinear interpolations on surfaces that are generated based on the rendering results of a standard computer processing unit (CPU) or graphics processing unit (GPU). A surface may be a rectangular texture map with a transformation matrix to specify its location in the scene. The fundamental unit of the texture map is a texel (also known as texture element or texture pixel), and the texture map includes arrays of texels representing a particular texture space.

Distance field labels are not susceptible to blurry edges caused by interpolation operations. Distance fields can increase sharpness of a rendering to reduce blurriness of an edge of an image (e.g., by reducing the blur at the edge of a text). In addition, distance fields can be resampled without introducing artifacts, including when the labels are magnified or stretched. However, a side-effect of distance field labels is the aliasing of a graphic, particularly near the edges of graphics such as text, icons, glyphs, and other 2D images, in a 3D environment. That is because in traditional methods, resampling a signed distance field produces a signed value per pixel, where the sign specifies on which side of an edge the sample position falls. If inside, the inside color is rendered; if outside, the outside color is rendered. The techniques described herein provide various ways to produce anti-aliased results with distance fields. These techniques may be used with both single-distance and multi-distance distance fields. Details of such techniques are described in U.S. patent application Ser. No. 16/583,878 ("Distance Field Color Palette," filed on 26 Sep. 2019) and U.S. patent application Ser. No. 16/584,016 ("Dual Distance Field Color Palette," filed on 26 Sep. 2019), which are incorporated by reference in their entirety.

Single Distance Fields

Particular embodiments described herein are directed to texels that each have a single distance field. At a high level, distance fields are used to indicate the location of edges between solid-color regions (e.g., foreground and background) in a 2D label, such as a texture. Each texel stores a representation of the distance of the texel center to the nearest edge, bounded by a maximum distance, beyond which a texel is determined to be outside a particular array. In particular embodiments, 6-bits may be allocated for indicating the distance value, with the MSB representing whether the texel center is "in" (e.g., represented by 1) or "out" (e.g., represented by 0). If the texel is far away from an edge, the remaining 5-bits would be a large value; conversely, if the texel is close to an edge, the remaining 5-bits would be small. In particular embodiments, for a sampling location P, bilinear interpolation of the distance fields of the four closest texels can be used to determine which side of the edge the sampling location P is on. As an example, a zero (0) in the high order bit (e.g., the MSB) of the interpolated distance indicates that the sampling location P is outside the region defined by the edge and a one (1) in the high order bit of the interpolated distance indicates that the sampling location P is inside the region defined by the edge. If the distance is zero, the sampling location P is directly on the edge. Notably, the distance fields in particular embodiments described herein may be unsigned numbers, so that the lowest value is zero and no value encodes a position exactly on the edge. This is in contrast to other distance fields encoded using signed values (e.g., the MSB of a distance field may represent whether the value is positive or negative, which corresponds to "in" or "out," or zero, which corresponds to "on edge"). The unsigned distance field encoding is beneficial because it avoids certain issues, such as when an edge passes through the center of a texel.

In particular embodiments, each texel of a label texture may include a distance field. The "in" and "out" status specified by the distance field maps to the label color and the background color, respectively. For example, if the label color is red and the background is green, a pixel having a sampled distance field of "in" would correspond to red, and a pixel having a sampled distance field of "out" would correspond to green. In particular embodiments, each texel of a label texture may include both a distance and a color index value. The color index values are used to select an entry in a color look-up table that can be customized for each label. In general, for a given sampling location, which texel's color index to select depends on the interpolated distance of the sampling location (e.g., whether its MSB=0 (out) or MSB=1 (in)) and the location of the sampling location in texture space relative to the nearby texels. For single distance labels, two interleaved color indices specify the color to use when the MSB of the interpolated distance is zero (out) or one (in). For dual distance labels (discussed in more detail below), four interleaved color indices specify the color to use for the four combinations of the MSB of the two interpolated distances.

FIG. 1 illustrates an example texel array 100 with various sampling locations placed inside and outside the edges of a character shape 110. The character shape 110 illustrates an "A" in which an edge 120 separates a color of the character shape 110 (e.g., the shaded region) from a color of the background 130. Texels (not shown for simplicity) within the shaded region are encoded with distance values indicating that they are "in" (with MSB=1) whereas texels outside of the shaded region are encoded with distance values indicating that they are "out" (with MSB=0). In addition, boundary 140 delineates the background 130 from the region beyond the array texel 100. Various sampling locations are shown, including sampling location 150 located inside the region defined by the edge 120 of the character shape 110, sampling location 160 located outside the region defined by the edge 120 of the character shape 110, sampling location 170 located on the edge 120 of the character shape 110, and sample 180 located outside of the boundary 140 of the texel array 100.

As will be discussed in more detail below, linear interpolation of the unsigned distance functions of the four nearest texels for each of sampling locations 150, 160 would determine that sampling location 150's interpolated distance has an MSB=1 (in) and sampling location 160's interpolated distance has an MSB=0 (out). In addition, linear interpolation of the distance functions of the four nearest texels for sampling location 170 would determine that the interpolated distance is exactly half the range of the unsigned distance field, which indicates that the sampling location 170 is directly on the edge 120 (if the distance field is signed rather than unsigned, the "on edge" scenario would be represented by an interpolated distance of 0). Moreover, sampling location 180 would be determined to be outside of the texel array 100 and thus have an unsigned distance of zero and an index of zero associated with a no color, or "transparent" result.

In particular embodiments, the interpolated distance computed for a sampling location may be used to determine an alpha blend value for anti-aliasing. In particular embodiments, alpha blending can be used to determine the color of a pixel area represented by the sampling location directly on or near an edge. Each sampling location may have a filter region that corresponds to the pixel area represented by the sampling location. If the sampling location and its filter region are fully inside a label, then the color of the pixel corresponding to the sampling location would be the "in" color of the label. For example, in FIG. 1, sampling location 150 has a filter region 151 with a radius that is shorter than the distance between the sampling location 150 and the edge 120. As such, the color of the pixel corresponding to the sampling location 150 would be the "in" color of the "A" label. In this case, no alpha blending is needed. Similarly, if the sampling location and its filter region are fully outside a label, then the color of the pixel corresponding to the sampling location would be the "out" color of the label. For example, sampling location 160 has a filter region 161 with a radius that is shorter than the distance between the sampling location 160 and the edge 120. As such, the color of the pixel corresponding to the sampling location 160 would be the "out" color of the label. As such, no alpha blending is needed in this case either.

When a sampling location's filter region includes both sides of an edge, then alpha blending may be used to blend the "in" color and "out" color to produce a blended color for the corresponding pixel. For example, if the sampling location 160 has a larger filter region 162 that is greater than the distance between the sampling location 160 and the edge 120, then the filter region 162 would include both the inside and outside colors. In the illustrated example, the outside color would be weighted significantly more than the inside color when the two colors are blended. As another example, sampling location 170, which is located on the edge 120, has a filter region 171 that evenly covers both the inside and outside of the label. As such, the inside and outside colors could be evenly blended to produce the color of the corresponding pixel.

As shown in the examples above, anti-aliasing should be used when the filter region of a sampling location overlaps an edge. In particular embodiments, the interpolated distance of a sampling location can be used to determine an alpha blend value, and the value can be offset so that an interpolated distance of 0 becomes an alpha of 0.5. To anti-alias properly, the filter radius should be about half of a pixel (e.g., ½ of the diagonal length of a square pixel). So if a sampling location's distance from the nearest edge is greater than half of a pixel, no anti-aliasing is needed. Conversely, if the sampling location's distance from the nearest edge is smaller than half a pixel, anti-aliasing should be performed. However, the interpolated distance field that represents the distance between a sampling location and the nearest edge may be measured in units of texels, not pixels. Therefore, the interpolated distance field may need to be converted from texel units to pixel units. Further, in 3D computer graphics, a surface where a label appears may commonly be viewed at a slanted angle from the cameras, resulting in the fill area of the label's texture to not be square. Such anisotropic cases would also need to be dealt with to properly perform the distance conversion. The alpha blending techniques described below addresses these problems so that alpha reaches values of 0 and 1 at one half pixels away from the edge in the outside or inside, respectively. The algorithm includes computing a scale factor for converting the interpolated distance of a sampling location from texel units into pixel units. The converted distance may then be used to determine an appropriate alpha blend value for blending the inside and outside colors. In addition, the algorithm may be adjusted to be sharper or blurrier.

Alpha Blending

Figure 2:
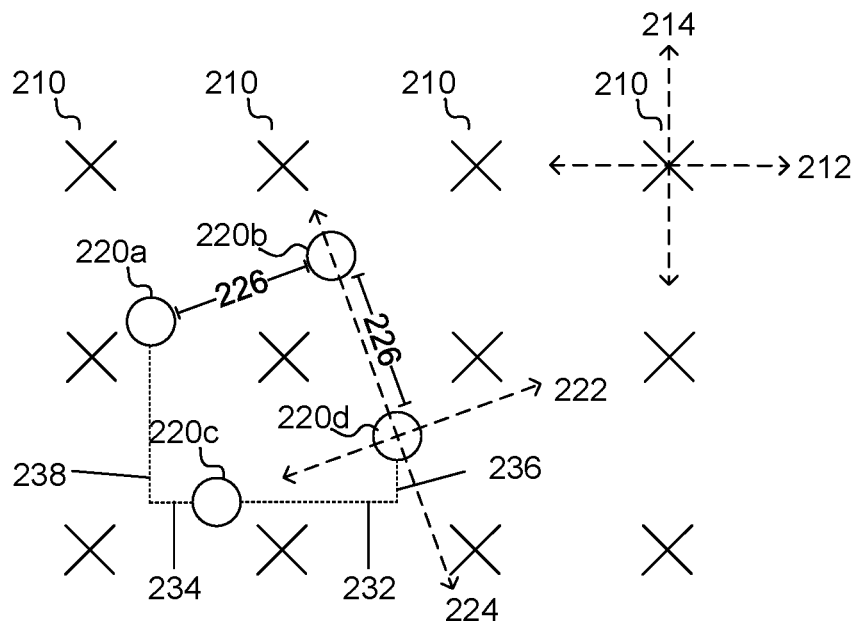
FIG. 2 illustrates an isotropic scaling case where a texel array being sampled is projected into X-Y pixel space.
Figure 3:
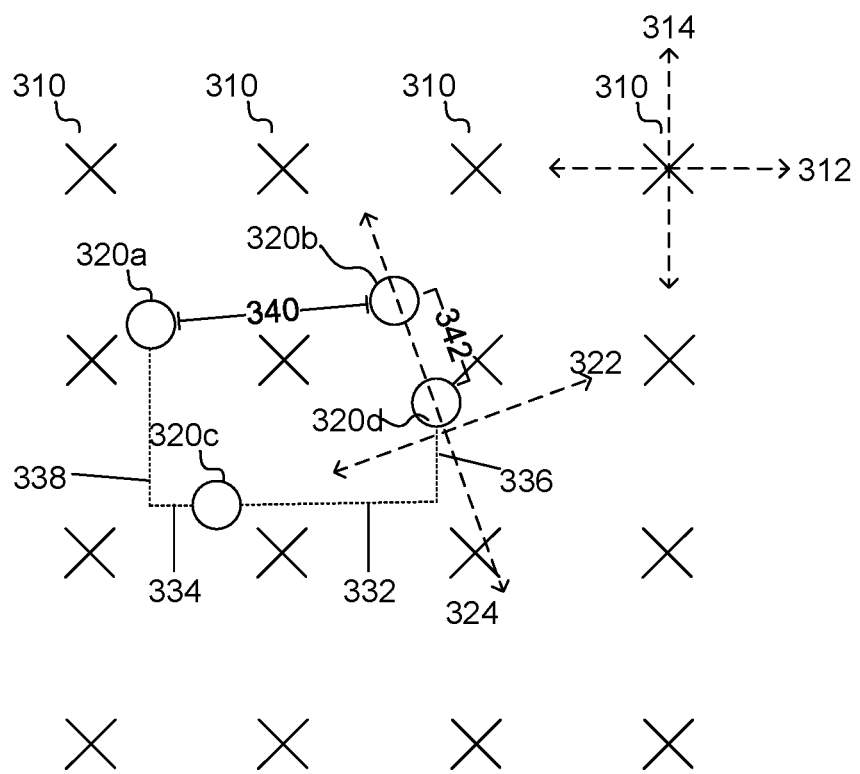
FIG. 3 illustrates anisotropic scaling case where a texel array being sampled is projected into X-Y pixel space.
Figure 4:
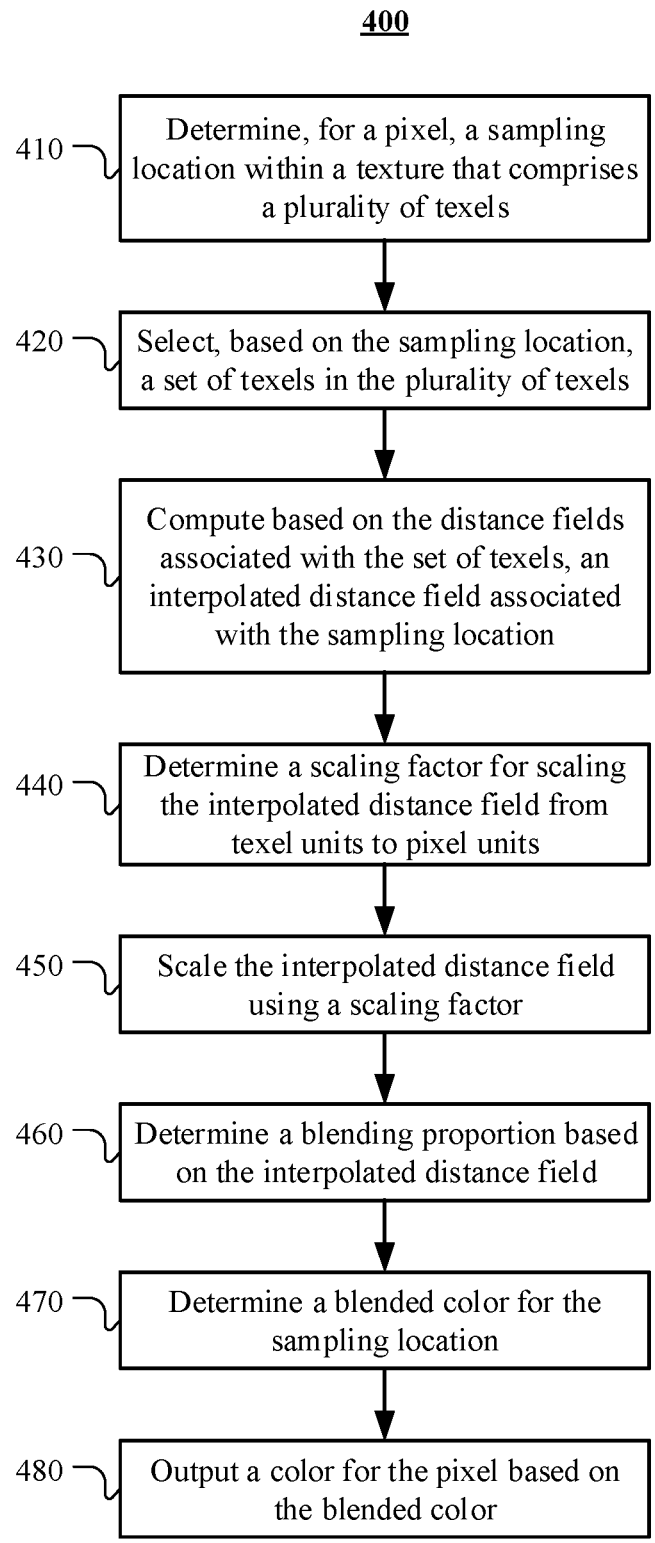
FIG. 4 illustrates an example method for reducing aliasing in graphics rendering.

The discussion of the alpha blending method for single distance field labels will focus on the embodiments shown in FIGS. 2 and 3, and the method described in FIG. 4. As briefly explained above, a scale factor is used to convert interpolated distances from texel units to pixel units.

In particular embodiments, the scale factor may be computed based on the dimensions of texels projected in pixel space. FIG. 2 illustrates an isotropic scaling case where a texel array being sampled is projected into X-Y pixel space. FIG. 2 shows an array of sampling locations at pixel centers 210, and an askew array of texel positions 220 (collectively referring to texel positions 220a, 220b, 220c, and 220d). Specifically, FIG. 2 illustrates an example four-by-four array of sampling locations at pixel centers 210, each pixel centers being represented by an "X" along the X-axis 212 and Y-axis 214. The texel positions 220 are each represented by an "O" along the U-axis 222 and the V-axis 224. The spacing between pixels 210 is the same in the X and Y directions, and the spacing 226 between texel positions 220 is the same along the U-axis 222 and the V-axis 224. This is referred to as an isotropic scaling case.

FIG. 3 illustrates an anisotropic scaling case. Similar to FIG. 2, FIG. 3 illustrates an array of sampling locations at pixel centers 310, and an askew array of texel positions 320 (collectively referring to texel positions 320a, 320b, 320c, and 320d). The pixel centers 310 are arranged on an X-axis 312 and a Y-axis 314, and the texel positions are arranged on a U-axis 322 and a V-axis 324. The spacing between pixels 310 is the same in the X and Y directions, but the spacings (e.g., 340 and 342) between the texel positions 320 are not the same along the U-axis and the V-axis. This is referred to as an anisotropic scaling case.

In particular embodiments, the scale factor for converting the interpolated distance of a sampling location from texel units to pixel units may be based on the distance between texel positions projected in X-Y pixel space, as shown in FIGS. 2 and 3. The distance between the texel positions can be measured in a variety of ways (e.g., measuring the direct or Euclidean distance), but for the purposes of this example, Manhattan distance is used.

The Manhattan distance between texel locations in the X and Y directions of the pixel array is measured in one embodiment as follows. Referring to FIG. 2, the dotted straight lines 232, 234, 236, and 238 measure the Manhattan distance between the two connected texel positions 220a and 220d. For example, the Manhattan distance between the texels 200a and 220d in the X direction ($len_X$) is determined by summing the change in position along the U-axis and the X-axis (dU/dX) 232 and the change in position along the V-axis and the X-axis (dV/dX) 234, as seen below:

$$len_X = \left|\frac{dU}{dX}\right| + \left|\frac{dV}{dX}\right|.$$

The Manhattan distance between texel positions 220a and 220d in the Y direction ($len_Y$) is determined by summing the change in position along the U-axis and the Y-axis (dU/dY) 236 and along the V-axis and the Y-axis (dV/dY) 238, as seen below:

$$len_Y = \left|\frac{dU}{dY}\right| + \left|\frac{dV}{dY}\right|.$$

These equations may also be applied in the anisotropic scaling case shown in FIG. 3. The dotted straight lines 332 (dU/dX), 334 (dV/dX), 336 (dU/dY), and 338 (dV/dY) measure the Manhattan distance between the two connected texel positions 320a and 320d.

After determining the distances $len_X$ and $len_Y$, the minimum of the two distances can be determined using:

$$len_{min} = \min(len_X, len_Y).$$

If the spacing between the texels is the same (e.g., isotropic), as is illustrated in FIG. 2, $len_X$ is equal to $len_Y$. However, if the spacing between the texels is not the same (e.g., anisotropic), as is illustrated in FIG. 3, $len_X$ is not equal to $len_Y$, and the minimum between $len_X$ and $len_Y$ is selected to compute the scaling. Typically, the minimum is selected because the direction with the smaller sample spacing results in decreased blurring at the cost of increased aliasing. The scaling S can be computed using:

$$S = \frac{2 * F}{len_{min}};$$

where the factor F is adjustable. For example, F can be set to 1.0 under normal settings, but can be increased to increase the blurring but reduce the aliasing resulting from alpha blending, or decreased to increase the aliasing but reduce the blurring resulting from alpha blending. The width of the filter radius in pixels can be measured using the inverse of F, 1/F (e.g., in the X or Y direction with the smallest length). Thus, if F=1, the filter radius is 1 pixel wide. As F approaches 0, the filter radius increases, and as F approaches infinity the filter radius decreases. As an example, if F=2, the filter radius would be ½ pixel wide; if F=½, the filter radius would be 2 pixels wide. The scale S is then used to convert the interpolated distance of a sampling location from texel units to pixel units. As previously described, for a sampling location, the distance fields of the four closest texels can be interpolated to determine a signed distance D from the edge of a text, icon, glyph, or other 2D images. In some embodiments, D can be measured in units of texels (e.g., if D is 0.5, then the texel center is 0.5 texels away from the edge). As an example, referring again to FIG. 1, interpolation of the four closest texels can be used to determine the sampling location 150 is located inside the region defined by the edge 120 of the character shape 110, the sampling location 160 is located outside the region defined by the edge 120 of the character shape 110, the sampling location 170 is located on the edge 120 of the character shape 110, or the sampling location 180 is located outside of the boundary 140 of the texel array 100.

Once the scaling S and the distance D for the sampling location are determined, an alpha value a (or transparency value) can be determined. The alpha value a specifies the proportion of the "in" color, and 1-α specifies the "out" color (or vice versa). That is, a blending proportion can be determined based on the alpha value. The alpha value is clamped to the range [0,1] and is computed based on the post-scaled distance (i.e., S*D) offset by, for example, ½ so that the alpha value is ½ when the sampling location is directly on an edge (D=0). The alpha value a can be computed using:

$$\alpha = \text{clamp}\left(\frac{1}{2} + S*D, 0, 1\right).$$

After solving for the alpha value of the color inside the edge and the alpha value of the color outside the edge, a blended color for the sampling location can be determined by blending a first color associated with a first side of the edge (e.g., the "in" color) and a second color associated with a second side of the edge (e.g., the "out" color). For example, the color inside an edge and the color outside an edge can be blended. The color of the pixel containing the sampling location can be determined using:

color=α*$color_{in}$+(1-α)*$color_{out}$.

The output color based on the blended color can contain a first percent proportion of the first color and a second percent proportion of the second color. The first percent proportion and the second percent proportion can respectively correspond to an apparent transparency of the first color and the second color. For example, for D equals 0 (where a sampling location is directly on the edge of the character), the alpha value for that location is ½ for both the inside and outside alpha values, indicating the transparency of the color will be 50% the known color inside the character, and 50% the known color outside the character. So, if a black text is on a white background, a sampling location located on the edge of the character (e.g., sampling location 170 directly on the edge of the letter A in FIG. 1) will be an equal blend of the black inside and white outside colors: grey. The alpha value can be clamped to a range of [0,1]. Furthermore, while an offset of ½ a pixel for the post-scaled distance (i.e., S*D) is described, other offsets (e.g., wherein the first color and the second color are blended when the sampling location is within a predetermined range from the edge depicted in the texture) such as when the sampling location is ⅛, ¼, ⅜, ⅝, ¾, or ⅞ a pixel from the edge depicted in the texture are also possible to bias the anti-aliasing color towards either one of the "in" or "out" colors. Offsetting the post-scaled distance (i.e., S*D) effectively moves the edge by the specified offset distance in pixels. In some embodiments, instead of offsetting the post-scaled distance, the pre-scaled distance D may be offset to effectively move the edge by the specified offset distance in texels. For example, offsetting D by ¾ effectively moves an edge by ¾ texels. Also, although this disclosure describes alpha blending by combining two color images on top of one another, other forms of blending or mixing modes are imagined, such as dissolve, multiply and screen, or other modes.

FIG. 4 illustrates an example method 400 for reducing aliasing in graphics rendering. The method may begin at step 410, where a computing system determines, for a pixel, a sampling location within a texture that comprises a plurality of texels. At step 420, the computing system selects, based on the sampling location, a set of texels in the plurality of texels, wherein each texel in the set of texels encodes at least a distance field. At step 430, the computing system computes, based on the distance fields associated with the set of texels, an interpolated distance field associated with the sampling location, wherein the interpolated distance field represents a relative distance between the sampling location and an edge depicted in the texture. At step 440, the computing system determines a scaling factor for scaling the interpolated distance field from texel units to pixel units. At step 450, the computing system scales the interpolated distance field using the scaling factor. At step 460, the computing system determines a blending proportion based on the interpolated distance field. At step 470, the computing system determines a blended color for the sampling location by blending, according to the blending proportion, a first color associated with a first side of the edge and a second color associated with a second side of the edge. At step 480, the computing system outputs a color for the pixel based on the blended color of the sampling location. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for reducing aliasing in graphics rendering including the particular steps of the method of FIG. 4, this disclosure contemplates any suitable method for reducing aliasing in graphics rendering including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Jittering

One limitation of the alpha blended approach occurs when a label is stretched. When that happens, the texture storing the distances, which is indexed by (U,V) coordinates, is sampled at different spacings in the U and V directions. For example, if the texture of a character "A" appears wider when it is projected into pixel space (i.e., it is stretched horizontally), the texture would be sampled more sparsely in the horizontal direction than in the vertical direction. Thus, using the same sampling filter would cause either over-blurring in one direction or more aliasing in the other direction.

Particular embodiments may optimize alpha-blending in the direction with the smaller sample spacing (e.g., based on $len_{min}$) to avoid excessive blurring. However, this would result in more aliased edges in the other direction (e.g., the $len_{max}$ direction). The problem can be mitigated by using jittering or super-sampling in the direction with wider sample spacings.

In traditional jittering methods, anti-aliasing is achieved by applying different two-dimensional (x,y) offsets to the sampling location of a pixel (e.g., the sampling location could correspond to the center of the pixel) so that multiple sampling locations are used to determine the color of the pixel. Jittering could be achieved by scattering multiple sampling locations within each 1×1 pixel area for every frame. That is, a blended color for the pixel, for any given frame, may be determined based on multiple sampling location within the pixel area. For example, five jittered sampling locations scattered within the pixel area may yield different colors (e.g., the color of each sampling location may be determined using the alpha-blending technique described above). The five colors corresponding to the jittered sampling locations may be averaged to determine the color of the pixel. However, this spatial jittering approach means that more compute is needed to generate each frame.

To reduce computational strain, another option is to jitter temporally so that the number of sampling locations used per pixel per frame remains the same (e.g., 1 sampling location per pixel per frame), but different (x,y) offsets are used in each frame. For example, for a particular pixel, let $p_1 \ldots p_n$ represent the colors of that pixel in frames $1 \ldots n$, respectively. The colors $p_1 \ldots p_n$ are sampled from a texture using different sampling locations within the pixel. Since the sampling locations differ, the colors $p_1 \ldots p_n$ for the same pixel could differ from frame to frame. As such, jittering temporally is liable to produce flashing artifacts unless the frame rate is high or the number of frames in the set is small. For example, if the frame rate is 1000 fps, one might choose a 16-frame sequence so that the sequence recurs about 60 times per second. If the frame rate is 180 fps, one might choose a 4-frame sequence, so that the sequence recurs 45 times per second.

In particular embodiments, jittering may be used with the alpha-blending technique described above to reduce aliasing when a label is stretched. Alpha-blending could be optimized for the direction with the smaller sample spacing (e.g., $len_{min}$), and jittering could be used in the direction with the larger sample spacing (e.g., $len_{max}$). Since this involves only either an (x) or (y) offset instead of a two-dimensional (x,y) offset, a smaller number of sampling locations are required. As a result, anti-aliasing can be achieved with a lower frame rate without introducing flashing artifacts. The separation between the one-dimensionally-jittered sampling locations is based on the difference between the U and V sample spacings (e.g., $len_{max}-len_{min}$). As a result, if there is no stretching (e.g., $len_{max}=len_{min}$), the jittered sampling locations remain at the same place across frames. As the amount of stretching increases, the jittered sampling locations become farther apart to compensate.

As described in the method above, after determining $len_X$ and $len_Y$, $len_{min}$ can be determined. Further, $len_{max}$, the larger of the two distances between the texel positions (e.g., across the X-axis 312, or the Y-axis 314) can be determined, as shown below:

$len_{max}=\max(len_X, len_Y)$.

The larger of $len_X$ and $len_Y$ can determine a jitter orientation. Computational strain can be reduced by jittering only in the direction corresponding to $len_{max}$, e.g., the direction where the image is stretched the most. For example, this direction can correspond to either a horizontal sampling space in the texture, or a vertical sampling space in the texture. Following the determination of $len_{max}$ and $len_{min}$, $jitter_{max}$ can be computed using:

$$jitter_{max} = \frac{len_{max} - len_{min}}{2}.$$

The jitter sampling locations in the direction corresponding to $len_{max}$ may be selected to be within $-jitter_{max}$ and $+jitter_{max}$.

Figure 5A:
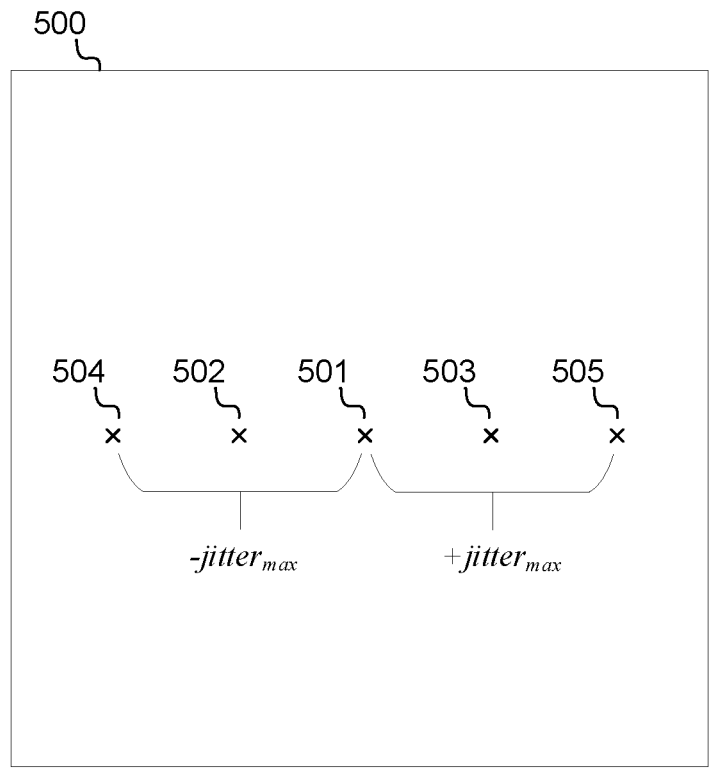
FIG. 5A illustrates an example of jittered sampling locations for a pixel when the sampling spacing is larger in the X direction.

FIG. 5A illustrates an example of jittered sampling locations 501-505 for a pixel 500 when the sampling spacing is larger in the X direction. For example, using the alpha blending algorithm described above, a computing system may determine that $len_{min}$ corresponds to $len_y$. Consequently, the system may optimize the scaling factor S used in the alpha blending algorithm based on $len_s$. To reduce aliasing in the X direction, the system could jitter the sampling locations in the X direction, as shown in FIG. 5A. The computed $jitter_{max}$ value may be used to determine the spatial range of the jitter. Since $jitter_{max}$ is proportional to $len_{max}-len_{min}$, the spatial range of the jitter would be larger when the sampling spacing is larger, and the spatial range of the jitter would be smaller when the sampling spacing is smaller. For example, as shown in FIG. 5A, the sampling locations may be distributed in the X direction within a threshold distance defined by $jitter_{max}$ from the center sampling location 501. Once the range is determined, any suitable number of sampling locations may be selected within that range (e.g., FIG. 5A shows five sampling locations being used). If spatial jittering is used, the five jittered sampling locations 501-505 could be used to sample a texture for a single frame. If temporal jittering is used, the first frame in a sequence of frames may use sampling location 501 to determine the color of the pixel 500, the second frame in the sequence of frames may use sampling location 502 to determine the color of the pixel 500, and so on. In particular embodiments, both spatial and temporal jittering could be used simultaneously. For example, the first frame in a sequence of frames may use sampling locations 502 and 503 to determine the color of pixel 500, and the second frame in the sequence of frames may use sampling locations 501, 504, and 505 to determine the color of pixel 500.

Figure 5B:
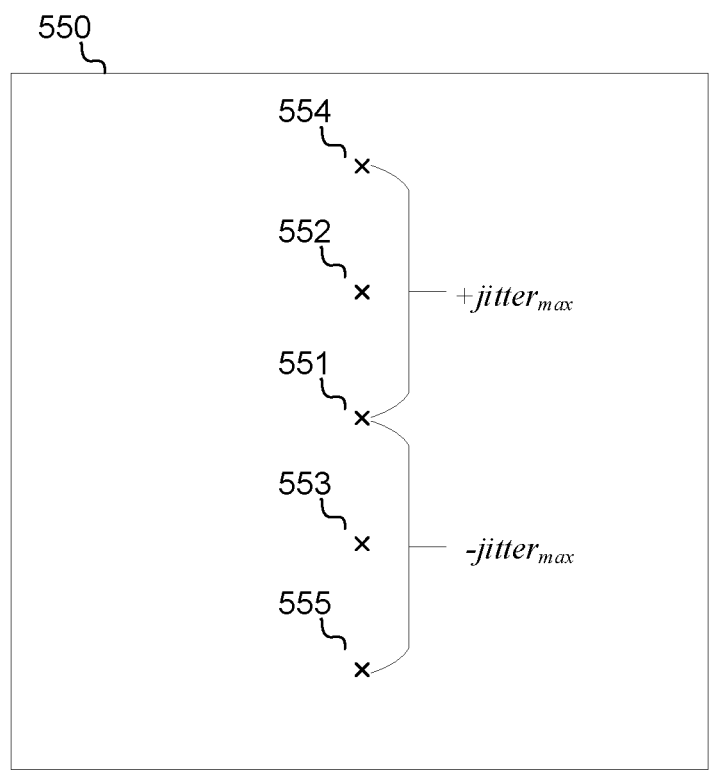
FIG. 5B illustrates an example of jittered sampling locations for a pixel when the sampling spacing is larger in the Y direction.

FIG. 5B illustrates an example of jittered sampling locations 551-555 for a pixel 550 when the sampling spacing is larger in the Y direction. For example, using the alpha blending algorithm described above, a computing system may determine that $len_{min}$ corresponds to $len_x$. Consequently, the system may optimize the scaling factor S used in the alpha blending algorithm based on $len_x$. To reduce aliasing in the Y direction, the system could jitter the sampling locations in the Y direction, as shown in FIG. 5B. The computed $jitter_{max}$ value may be used to determine the spatial range of the jitter. For example, as shown in FIG. 5B, the sampling locations may be distributed in the Y direction within a threshold distance defined by jitter$_{max}$ from the center sampling location 551. Once the range is determined, any suitable number of sampling locations may be selected within that range (e.g., FIG. 5B shows five sampling locations being used). As described previously, the sampling location may be used in a spatial jitter scheme, temporal jitter scheme, or a combination of spatial and temporal jitter scheme.

Figure 6:
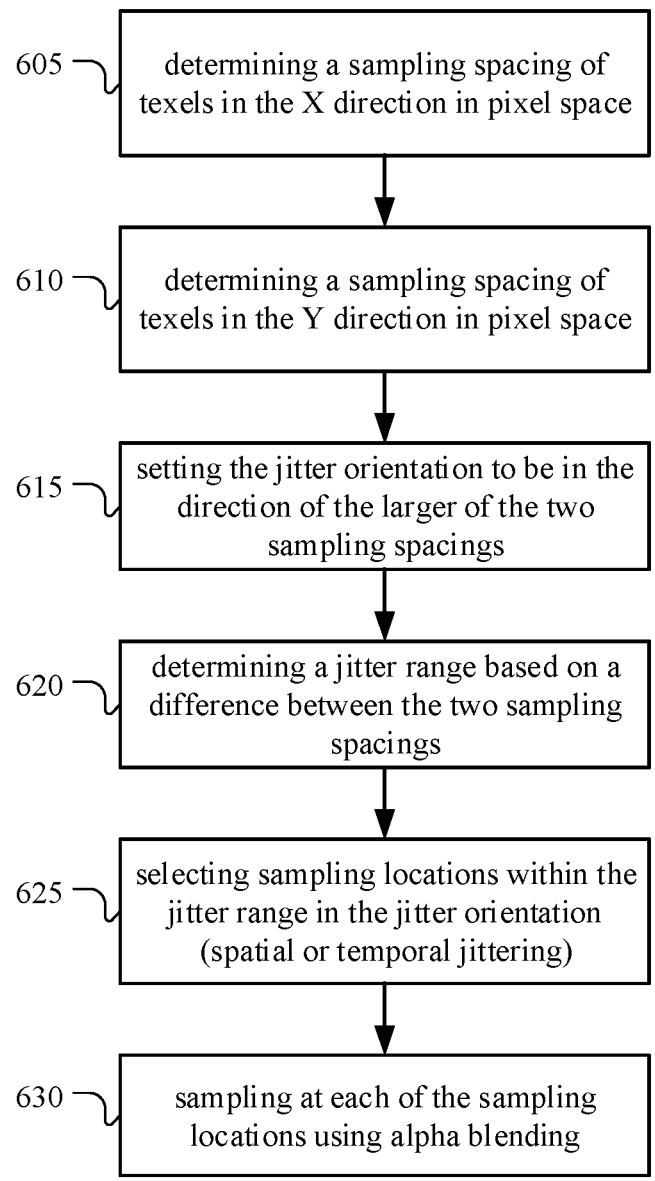
FIG. 6 illustrates an example method for jittering sampling locations for a pixel.

FIG. 6 illustrates an example method 600 for jittering. The method may begin at step 605, where the computing system may determine a sampling space of texels in the X direction in the pixel space. At step 610, the computing system may determine a sampling space of texels in the Y direction in the pixel space. At step 615, the computing system may set the jitter orientation to be in the direction of the larger of the sampling space of texels in the X direction or the sampling space of texels in the Y direction. At step 620, the computing system may determine a jitter range based on a difference between the two sampling spacings. At step 625, the computing system may select sampling locations within the jitter range in the jitter orientation. The sampling location may be used in a spatial jitter scheme, a temporal jitter scheme, or a combination of spatial and temporal jitter scheme. At step 630, the computing system may sample at each of the sampling locations using alpha blending. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for spatial jittering including the particular steps of the method of FIG. 6, this disclosure contemplates any suitable method for spatial jittering including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Multi-Distance Blending

The alpha-blending and jittering techniques described above may also be applied to textures that have more than one distance field per texel. Using single distance fields based on the distance to only one edge may result in the sharp corners (e.g., a diamond shape) of characters or glyphs to appear rounded or smoothed-out when they are rendered, especially as the resolution of the distance field decreases. A solution to this is to use dual distance fields to capture information at the intersection between two edges. In particular embodiments, when a label (e.g., character, glyph, etc.) is created, an authoring software that created the label may identify and label edges, such as type0 and type1 edges. Dual distance fields capture a texel's distances to two different types of edges to preserve intersection data. Each texel in a dual distance field label has two distance values: distance0 denotes the distance from the texel to the closest type0 edge and distance1 denotes the distance from the texel to the closest type1 edge.

Figure 7:
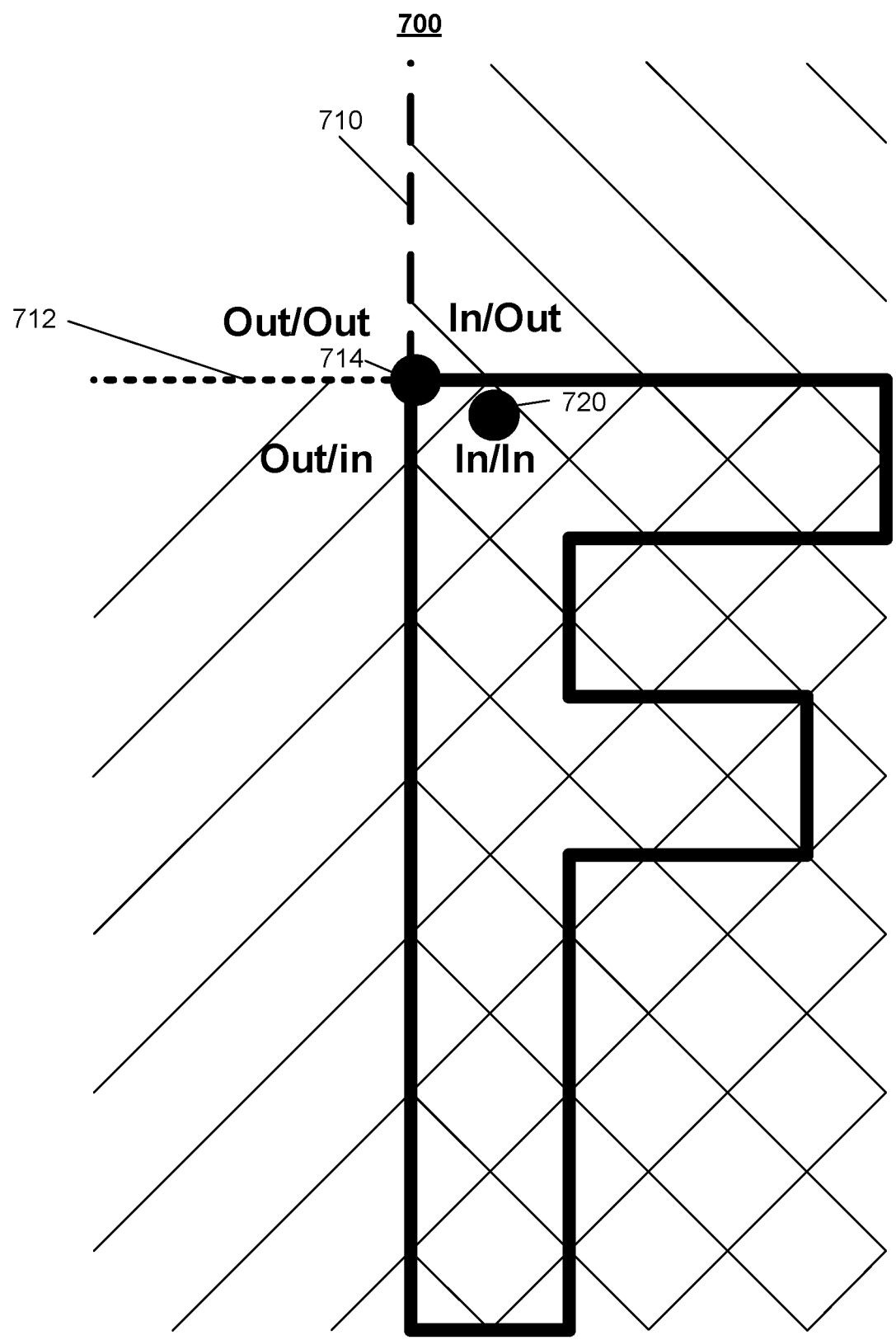
FIG. 7 is an example dual distance field label with various sampling locations placed inside and outside the edges of a character shape.

As previously discussed, each distance value of a texel encodes whether the texel is "in" or "out" relative to the edge from which the distance is measured. For a dual distance field texel, each of its distance value could be either "in" or "out," which means that there are four "in" and "out" combinations for each texel. FIG. 7 illustrates an example texture 700 associated with a letter "F" where two different edge-type edges meet at a vertex, resulting in four different regions associated with four different combinations of being inside or outside of each of the edges. As shown in FIG. 7, a type0 edge 710 and a type1 edge 712 intersect at point 714. Although the edges 710, 712 are drawn as solid lines, the entire length of each edge 710, 712 is not necessarily all visible in the label (the invisible portions are shown as dotted lines). Texels that are below edge 712 may be deemed "in" relative to edge 712 and texels that are above edge 712 may be deemed "out" relative to edge 712. Similarly, texels that are to the right of edge 710 may be deemed "in" relative to edge 710 and texels that are to the left of edge 710 may be deemed "out" relative to edge 710.

Because type0 edge 710 intersects with type1 edge 712 at point 714, four different regions are formed (i.e., an upper-left region, an upper-right region, a lower-left region, and a lower-right region). The texels in each region would have a different "in" and "out" combination relative to the two edges 710, 712. For example, texels in the upper-left region would have an out/out combination relative to edges 710/712, respectively; texels in the upper-right region would have an in/out combination; texels in the lower-left region would have an out/in combination, and texels in the lower-right region would have an in/in combination. Each combination of "in" and "out" may be associated with a color. For example, regions that are in/in would be considered to be foreground, and everything else (i.e., out/out, in/out, or out/in) would be considered to be background. Using FIG. 7 as an example, for the acute angle of the letter "F" at point 714, in/in would designate foreground and the rest would bet set to background.

The alpha-blending and jittering techniques described above may be applied to texels with multi-distance fields as follows. Each in/out combination may correspond to a color. For instance, continuing with the example above, the in/in combination may correspond to a color $C_{in}$ and the other three combinations may all correspond to a color $C_{out}$. The alpha-blending proportion for these two colors may be computed using the alpha values computed using the method described above. Let α1 represent the alpha value for being "in" one edge (e.g., edge 710) and α2 represent the alpha value for being "in" the other edge (e.g., edge 712). The color for the pixel could be computed using:

$$\text{color} = (\alpha1 * \alpha2) * C_{in} + (1 - \alpha1) * (1 - \alpha2) * C_{out} + (1 - \alpha1) * (\alpha2) * C_{out} +$$
$$(\alpha1) * (1 - \alpha2) * C_{out} = (\alpha1 * \alpha2) * C_{in} + (1 - \alpha1 * \alpha2) * C_{out}.$$

The methods above can further be used when multiple edges near a sampling location for a pixel select more than two colors. In the general case, the product of alpha or one minus alpha for each of the edges represents the contribution of the color that is associated with that combination of in and out colors. The colors that are associated with the combinations of edges may be specified in a variety of ways, including global rules or an array or other structure of data corresponding to different parts of the distance texture. Referring again to FIG. 7, the out/out region may be associated with a color $C_{out\text{-}out}$, the in/in region may be associated with a color $C_{in\text{-}in}$, the in/out region may be associated with a color $C_{in\text{-}out}$, and the out/in region may be associated with a color $C_{out\text{-}in}$. When sampling near point 714, the sampling location would have an interpolated distance from edge 710 and another interpolated distance from edge 712. Depending on which of the two edges is closer to the sampling location, the alpha-blending technique could be applied to the interpolated distance to that closer edge. The resulting alpha-blending proportion may be applied to the color associated with the region where the sampling location is in and the color associated with the adjacent region across the closer edge. Take, for example, the sampling location 720. By comparing its interpolated distance from edge 712 and its interpolated distance from edge 710, a computing system could be able to determine that the sampling location 720 is closer to edge 712. Based on the interpolated distance to edge 712, the system could compute the alpha-blending proportion between the color $C_{in-in}$ and the color $C_{in-out}$. The blending result would be used as the color for the corresponding pixel. For example, let α1 represent the alpha value for being "in" one edge (e.g., edge 710) and α2 represent the alpha value for being "in" the other edge (e.g., edge 712). The color for the pixel could be computed using:

$$\text{color} = (\alpha 1 * \alpha 2) * C_{in-in} + (1 - \alpha 1) * (1 - \alpha 2) * C_{out-out} + (1 - \alpha 1) * (\alpha 2) * C_{out-in} + (\alpha 1) * (1 - \alpha 2) * C_{in-out}.$$

Systems and Methods

Figure 8:
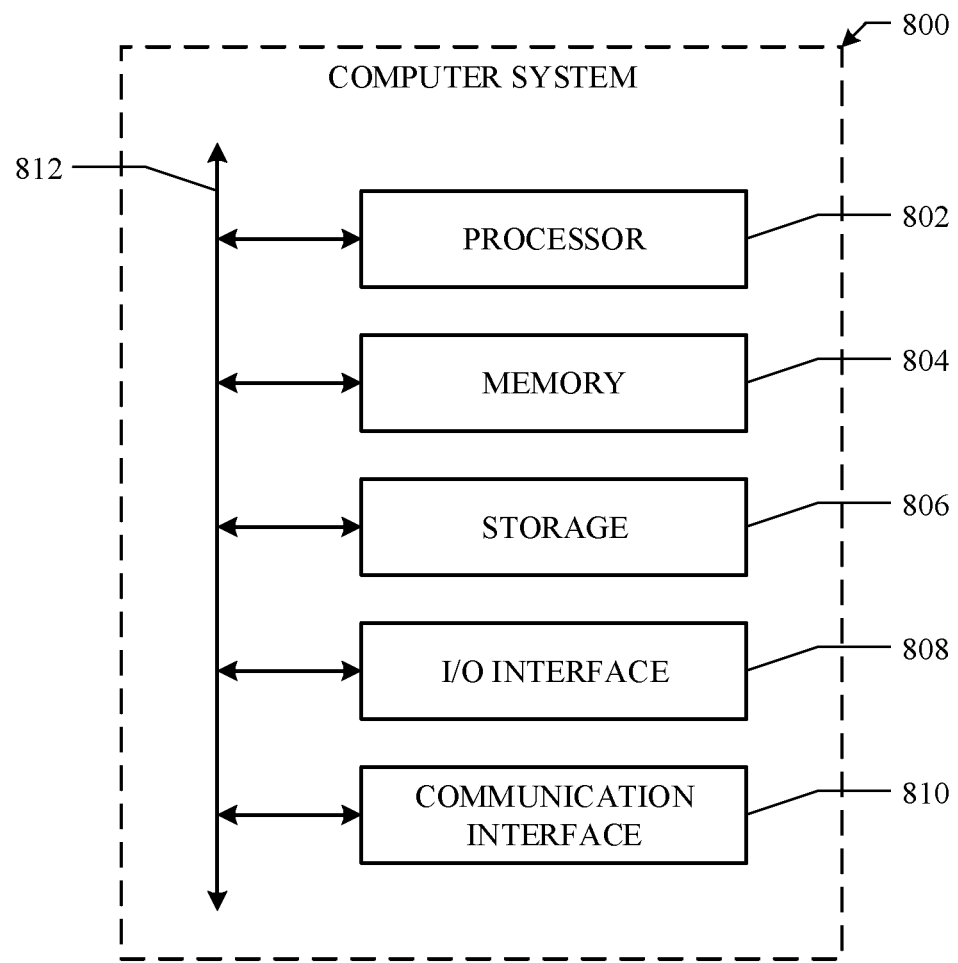
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    determining, for a pixel, a sampling location within a texture that comprises a plurality of texels;
    selecting, based on the sampling location, a set of texels in the plurality of texels, wherein each texel in the set of texels encodes at least a distance field;
    computing, based on the distance fields associated with the set of texels, an interpolated distance field associated with the sampling location, wherein the interpolated distance field represents a relative distance between the sampling location and an edge depicted in the texture;
    determining a scaling factor for scaling the interpolated distance field from texel units to pixel units;
    scaling the interpolated distance field using the scaling factor;
    determining a blending proportion based on the scaled interpolated distance field;
    determining a blended color for the sampling location by blending, according to the blending proportion, a first color associated with a first side of the edge and a second color associated with a second side of the edge; and
    outputting a color for the pixel based on the blended color of the sampling location.

2. The method of claim 1, further comprising:
    accessing a predetermined offset for the scaled interpolated distance field;
    wherein the blending proportion is further determined based on the predetermined offset for the scaled interpolated distance field.

3. The method of claim 2, further comprising:
    determining a first sampling spacing of the plurality of texels in a first direction in pixel space;
    determining a second sampling spacing of the plurality of texels in a second direction in pixel space, the second direction being perpendicular to the first direction; and
    comparing the first sampling spacing and the second sampling spacing to determine which is smaller;
    wherein the scaling factor is determined based on the smaller one of the first sampling spacing or the second sampling spacing.

4. The method of claim 1, further comprising:
    determining one or more second blended colors for one or more second sampling locations for the pixel; and
    determining the color for the pixel based on the blended color of the sampling location and the one or more second blended colors of the one or more second sampling locations for the pixel;
    wherein the color for the pixel is included in a frame.

5. The method of claim 4, further comprising:
    determining a first sampling spacing of the plurality of texels in a first direction in pixel space;
    determining a second sampling spacing of the plurality of texels in a second direction in pixel space, the second direction being perpendicular to the first direction; and
    determining a jitter orientation based on a comparison between the first sampling spacing and the second sampling spacing;
    wherein the sampling location and the one or more second sampling locations in the texture correspond to locations in the pixel that are distributed along the jitter orientation.

6. The method of claim 5, further comprising:
    determining a jitter range based on a difference between the first sampling spacing and the second sampling spacing;
    wherein the locations in the pixel corresponding to the sampling location and the one or more second sampling locations in the texture are distributed within the jitter range along the jitter orientation.

7. The method of claim 1, wherein the color for the pixel is associated with a first frame in a sequence of frames, the method further comprising:
    determining a second blended color for a second sampling location associated with a second pixel in a second frame in the sequence of frames, wherein:
        a relative location of the pixel in the first frame and a relative location of the second pixel in the second frame are the same; and
        a location in the pixel corresponding to the sampling location within the texture and a second location in the second pixel corresponding to the second sampling location within the texture are different;
    outputting a second color for the second pixel based on the second blended color of the second sampling location;
    wherein the second color for the second pixel is included in the second frame.

8. The method of claim 7, further comprising:
    determining a first sampling spacing of the plurality of texels in a first direction in pixel space;
    determining a second sampling spacing of the plurality of texels in a second direction in pixel space, the second direction being perpendicular to the first direction; and
    determining a jitter orientation based on a comparison between the first sampling spacing and the second sampling spacing;
    wherein the location in the pixel and the second location in the second pixel are distributed along the jitter orientation.

9. The method of claim 1, wherein the first color and the second color are blended in response to a determination that the sampling location is within a predetermined range from the edge depicted in the texture.

10. The method of claim 9, wherein the predetermined range is half a pixel from the edge depicted in the texture.

11. The method of claim 1, wherein the output color based on the blended color contains a first percent proportion of the first color and a second percent proportion of the second color.

12. The method of claim 11, wherein the first percent proportion and the second percent proportion respectively correspond to an apparent transparency of the first color and the second color.

13. One or more computer-readable non-transitory storage media embodying software that is operable when executed to:
determine, for a pixel, a sampling location within a texture that comprises a plurality of texels;
select, based on the sampling location, a set of texels in the plurality of texels, wherein each texel in the set of texels encodes at least a distance field;
compute, based on the distance fields associated with the set of texels, an interpolated distance field associated with the sampling location, wherein the interpolated distance field represents a relative distance between the sampling location and an edge depicted in the texture;
determine a blending proportion based on the interpolated distance field;
determine a blended color for the sampling location by blending, according to the blending proportion, a first color associated with a first side of the edge and a second color associated with a second side of the edge; and
output a color for the pixel based on the blended color of the sampling location.

14. The media of claim 13, wherein the software is further operable when executed to:
access a predetermined offset for the scaled interpolated distance field;
wherein the blending proportion is further determined based on the predetermined offset for the scaled interpolated distance field.

15. The media of claim 14, wherein the software is further operable when executed to:
determine a first sampling spacing of the plurality of texels in a first direction in pixel space;
determine a second sampling spacing of the plurality of texels in a second direction in pixel space, the second direction being perpendicular to the first direction; and
compare the first sampling spacing and the second sampling spacing to determine which is smaller;
wherein the scaling factor is determined based on the smaller one of the first sampling spacing or the second sampling spacing.

16. The media of claim 13, wherein the software is further operable when executed to:
determine one or more second blended colors for one or more second sampling locations for the pixel; and
determine the color for the pixel based on the blended color of the sampling location and the one or more second blended colors of the one or more second sampling locations for the pixel;
wherein the color for the pixel is included in a frame.

17. A system comprising:
one or more processors; and
one or more computer-readable non-transitory storage media coupled to one or more of the processors and comprising instructions operable when executed by one or more of the processors to cause the system to:
determine, for a pixel, a sampling location within a texture that comprises a plurality of texels;
select, based on the sampling location, a set of texels in the plurality of texels, wherein each texel in the set of texels encodes at least a distance field;
compute, based on the distance fields associated with the set of texels, an interpolated distance field associated with the sampling location, wherein the interpolated distance field represents a relative distance between the sampling location and an edge depicted in the texture;
determine a blending proportion based on the interpolated distance field;
determine a blended color for the sampling location by blending, according to the blending proportion, a first color associated with a first side of the edge and a second color associated with a second side of the edge; and
output a color for the pixel based on the blended color of the sampling location.

18. The system of claim 17, wherein the processors are further operable when executing the instructions to:
access a predetermined offset for the scaled interpolated distance field;
wherein the blending proportion is further determined based on the predetermined offset for the scaled interpolated distance field.

19. The system of claim 18, wherein the processors are further operable when executing the instructions to:
determine a first sampling spacing of the plurality of texels in a first direction in pixel space;
determine a second sampling spacing of the plurality of texels in a second direction in pixel space, the second direction being perpendicular to the first direction; and
compare the first sampling spacing and the second sampling spacing to determine which is smaller;
wherein the scaling factor is determined based on the smaller one of the first sampling spacing or the second sampling spacing.

20. The system of claim 17, wherein the processors are further operable when executing the instructions to:
determine one or more second blended colors for one or more second sampling locations for the pixel; and
determine the color for the pixel based on the blended color of the sampling location and the one or more second blended colors of the one or more second sampling locations for the pixel;
wherein the color for the pixel is included in a frame.

* * * * *